United States Patent [19]

Maehashi et al.

[11] 4,233,665
[45] Nov. 11, 1980

[54] DATE DATA PROCESSOR

[75] Inventors: Yukio Maehashi; Hidetoshi Kosaka, both of Tokyo, Japan

[73] Assignee: Nippon Electric Co., Ltd., Tokyo, Japan

[21] Appl. No.: 971,129

[22] Filed: Dec. 19, 1978

[30] Foreign Application Priority Data

Dec. 20, 1977 [JP] Japan .................. 52-153934

[51] Int. Cl.³ .................... G06F 15/02; G06F 15/20
[52] U.S. Cl. .................................... 364/715; 364/709
[58] Field of Search .................. 364/705, 709, 715

[56] References Cited

U.S. PATENT DOCUMENTS

| 4,101,962 | 7/1978 | Hakata | 364/715 X |
| 4,152,768 | 5/1979 | Kuriya | 364/705 |

OTHER PUBLICATIONS

E. Ying, "Microprocessor for a Perpetual Calendar Display", *IBM Technical Disclosure Bulletin*, vol. 18, No. 8, Jan. 1976, pp. 2515-2516.

*Primary Examiner*—Jerry Smith
*Attorney, Agent, or Firm*—Sughrue, Rothwell, Mion, Zinn and Macpeak

[57] ABSTRACT

A date data processor verifies whether an inputted date data exists or not. Inputted date data is stored in an input register which is composed of three sections according to month, day and year. A first calculating unit calculates the days difference between the inputted date data and a reference date, and the results are temporarily stored. A second calculating unit then performs an inverse calculating to arrive at a date based on the previously calculated days difference. The resulting date is compared with the inputted date to complete the verification.

7 Claims, 3 Drawing Figures

DATE DATA PROCESSOR

BACKGROUND OF THE INVENTION

The invention relates to a data processor for processing the data relating to date such as day, month and year and, more particularly, to an electronic desk-top calculator capable of processing such date data.

A small-sized calculator for processing the date data such as a desk-top calculator has been presented for practical use, in which calculator the input date data inputted is processed on the basis of a difference of the inputted date from a reference date. When an unreal date, for example, the 13th month 1, 1978 or Feb. 29, 1978, is erroneously applied to the calculator, the calculator processes the data without checking such erroneous date data, and presents an erroneous result. One of the conventional calculators, which is directed to solve such a problem, successively compares day, month and year of the input data with the correct data stored in the calculator, for the purpose of checking whether the input date data exists or not. Specifically, whether the data relating to year is calculable or not in the calculator is first checked. Whether the data relating to month is within the range 1 to 12 or not is then checked. Finally, the data relating to day is checked on the basis of the results of the checks of year and month. In checking the day data, it is necessary to check whether the year data is a leap year or not to determine if February has the 29th day or the 28th day as the final day. Therefore, the conventional calculator must store a large amount of data for the comparing reference. This fact encumbers the improvement of the manufacturing cost and size of the data processor such as a desk-top calculator.

SUMMARY OF THE INVENTION

Accordingly, an object of the invention is to provide a date data processor capable of judging whether input date data to be processed involves a real date or not.

Another object of the invention is to provide a small-sized electronic desk-top calculator with a checking function of the date data inputted.

The present invention may be briefly summarized as involving a data processor comprising: first memory means for storing a date to be operated and processed; means for calculating a difference of days from a reference date to the date to be operated; means for producing an inversely calculated date by inversely-calculating a date by using the days difference; second memory means for storing the inversely calculated date; and means for comparing the contents of the first memory means with the contents of the second memory means.

In operation, a keyed input date is converted to numerical date data and stored in an input register which is composed of three sections according to month, day and year. The inputted date data is then set into a second register also composed of three sections according to month, day and year. A first calculating unit then calculates the days difference between the date data stored in the second register and a reference date. In the specific example to be described, the reference date is Mar. 1, 1900. The days difference is calculated by first computing the difference in years, months and days and storing the results in the second register in the corresponding sections. The difference in years is multiplied by 365.25 and the difference in months is multiplied by 30.6, and the integer parts of these two products are summed with the difference in days. The thus calculated days difference is temporarily stored in a third register. A second calculating unit then inversely calculates the date from the days difference stored in the third register. First, the year is computed by dividing the contents of the third register by 365.25 and storing the integer part of the quotient in the corresponding section of the second register, the remainder being stored in the third register. Next, the contents of the third register are divided by 30.6, the integer part of the quotient being stored in the months' section of the second register and the remainder being stored in the third register. The contents of the third register are then rounded off and stored in the days' section of the second register. The contents of the second register are then compared in an Exclusive OR gate with the contents of the input register to verify whether the inputted date data exists.

BRIEF DESCRIPTION OF THE DRAWINGS

Other objects and features of the invention will be apparent from the following description taken in connection with the accompanying drawings, in which.

DESCRIPTION OF THE PREFERRED EMBODIMENT

Figure 1:
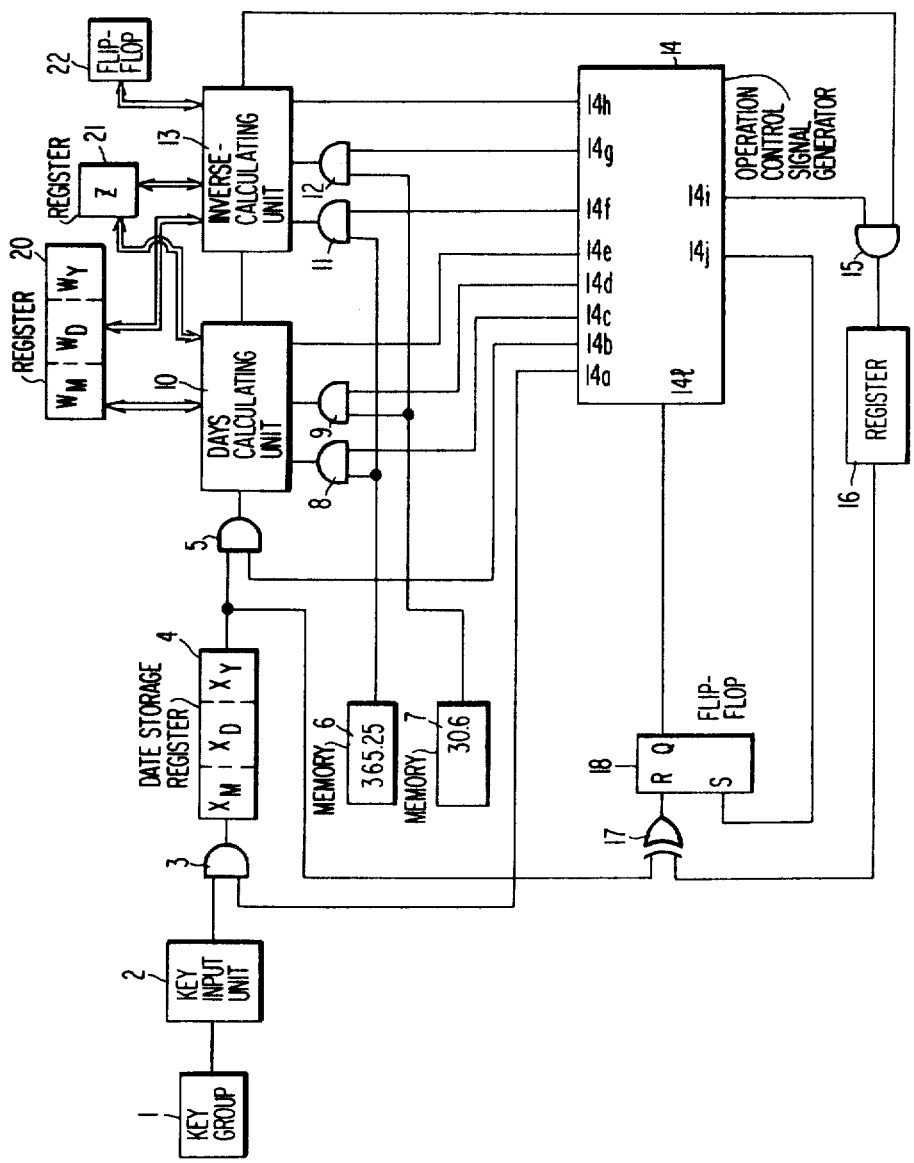
FIG. 1 shows a block diagram of an embodiment of a date data processor according to the invention.

Referring now to the drawings and, specifically, to FIG. 1, there is depicted a block diagram of a date data processor incorporating a preferred embodiment according to the invention. The date data applied by means of a key group 1 is converted into numerical data representing the input date by a key input unit 2 and the numerical data converted is then loaded into a date storage register 4 by way of an AND gate 3 in response to a signal 14a. The register 4 includes a memory area $X_D$ for storing "day", a memory area $X_M$ for storing "month" and a memory area $X_Y$ for storing "year". These memory areas are defined by a digit timing signal. To the other input of the AND gate 3 is applied a control signal 14a from an operation control signal generator 14 which sequentially produces various kinds of necessary signals for operation of the system. The output signal from the date storing register 4 is applied to the unit 10 for calculating the number of days, through a two-input AND gate 5 supplied at one input with a control signal 14b. The days calculating unit 10 is controlled by a control signal 14e and operatively associated with W register 20 and Z register 21. The W register includes a memory areas $W_Y$, $W_D$ and $W_M$. A memory circuit 6 for storing a constant 365.25 and a memory circuit 7 for storing a constant 30.6, which may be registers, are associated with the days calculating unit through AND gate 8 having one input to which signal 14c is applied and AND gate 9 having one input to which signal 14d is applied, respectively. Included in the days calculating unit 10 are arithmetic means such as an adder, gating means for interfacing W register 20 and Z register 21, and related gates for executing given arithmetic operations (not shown). The days calculating unit 10 calculates the number of days from the input date which is stored in the date storing register 4 to a given reference date, for example, Mar. 1, 1900, said number being referred to as the days difference or the difference of days.

Figure 2:
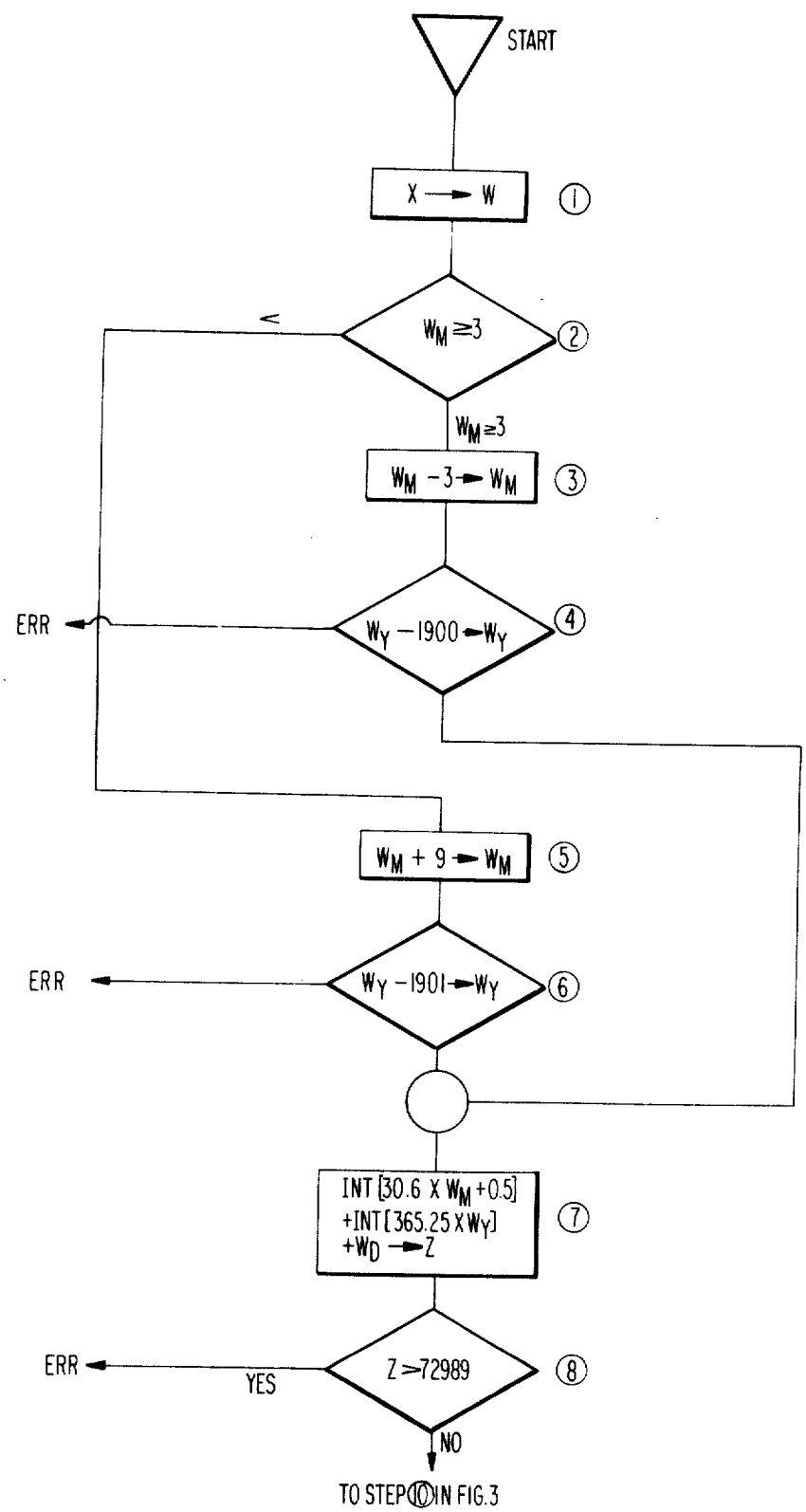
FIG. 2 shows a flow chart useful in explaining the operation of the date data processor shown in FIG. 1.

As an example, it will be assumed that the system is operating to calculate the difference of days in the case where the input date data is in a range from Mar. 1, 1900, to Feb. 28, 2100, and the reference date is Mar. 1, 1900. Reference is made to the flow chart of FIG. 2 which illustrates the operation of the calculation. At a first step (1), the contents of register 4 are loaded into the W register 20 associated with the days calculating unit 10 in synchronism with the control signal 14a. At this time, the contents of register 4 are not changed. More specifically, the contents of the memory areas $X_M$, $X_D$ and $X_Y$ are loaded into the memory areas $W_M$, $W_D$ and $W_Y$, respectively, thereby storing information relating to "month", "day" and "year" in the areas $W_M$, $W_D$ and $W_Y$, respectively. Then, at a second step (2), a determination is made as to whether the contents of the memory $W_M$, i.e. "month" are larger than 3 or not. If it is equal to or larger than 3, the control operation advances to step (3) and the result of subtraction of 3 from the contents of the memory area $W_M$ are reloaded into the memory area $W_M$. If the contents are smaller than 3, the operation advances to step (5) where 9 is added to the contents of $W_M$, which sum is reloaded into the $W_M$. Thus, the contents of $W_M$ obtained by steps (3) or (5) is the difference between the month of the input date and the month of the reference date. In this example, the reference month is March and therefore the number of months from March is the month difference. Accordingly, in the case of January and February, 10 and 11 months are the difference months from the reference month, i.e, March. This is obtained as shown in step (5). In this case, the operation proceeds to step (6) where the results of the subtraction of 1901 from the contents in the memory area $W_Y$ i.e "year" is reloaded into the $W_Y$. January and February are considered as the months in the previous year with respect to the reference month, i.e. March. For this reason, "1" must be subtracted from the difference between the year of the input date and the year of the reference date, for purpose of correction. Accordingly, the contents of the $W_Y$ loaded in step (6) are the difference years between the year of the inputted date data and the year of the reference date. While in the case of step (3), the year difference is the result of subtraction of the reference year 1900 from the year of the input date and is written into the area $W_Y$, as shown in step (4). In step (6), if the result is negative, the date data is not calculable in the date data processor, resulting in an error. Then, in step (7) the difference in days between the input date data and the reference date is calculated in response to signal 14e, by using the difference year stored in the memory area $W_Y$, the difference month stored in the memory area $W_M$, and the day stored in the area $W_D$. For this purpose, a constant 365.25 stored in the memory circuit 6, corresponding to the average number of days of one year including a leap year, is introduced into the days calculating unit 10 via the gate 8 in synchronism with the control signal 14c. Also, a constant 30.6 stored in the memory circuit 7 is introduced from the register 7 into the unit 10 via the gate 9 in synchronism with the control signal 14d. The sum of the integer part of the product of the constant 365.25 and the year difference loaded into the memory area $W_Y$ at steps (4) or (6), the integer part of the product of the constant 30.6 and the month difference loaded into the memory area $W_M$ at steps (3) or (5), and the day of the memory area $W_D$, is calculated, which sum is the day difference between the input date data and the reference data. The day difference i.e, the sum is loaded into the memory circuit Z. Then, in step (8) the contents of the memory circuit Z are checked to determine whether the contents are larger than the constant 72989. When the contents of the memory Z are larger than the constant, the input data is beyond Feb. 28, 2100, and is uncalculable, resulting in an error. In this manner, the days calculating unit 10 calculates the day difference between the input date and the reference date and stores it therein.

Figure 3:
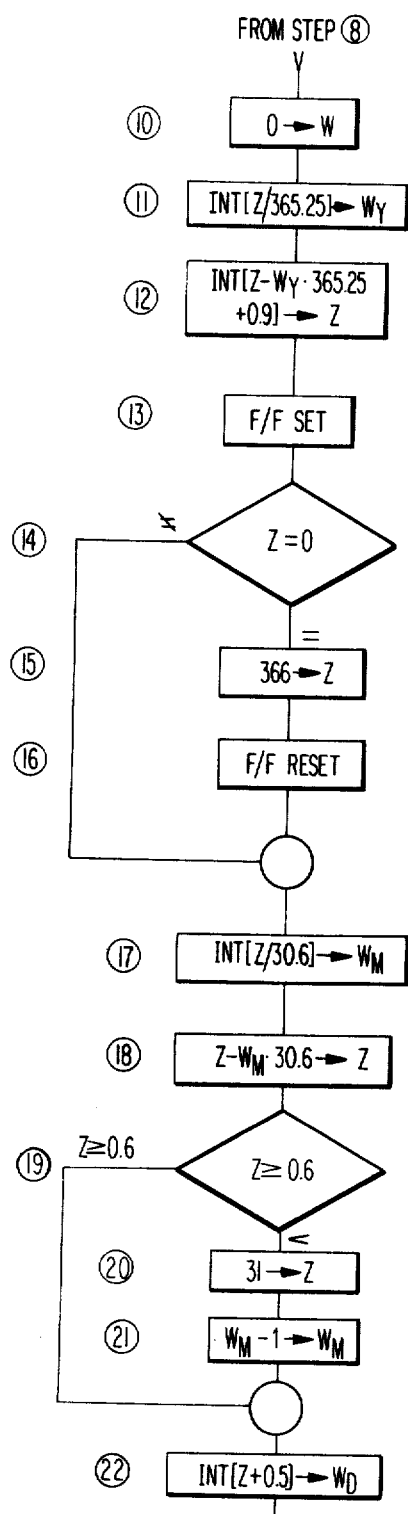
FIG. 3 shows a flow chart for illustrating an inverse-calculation of a date in the embodiment of the invention.
Figure 3:
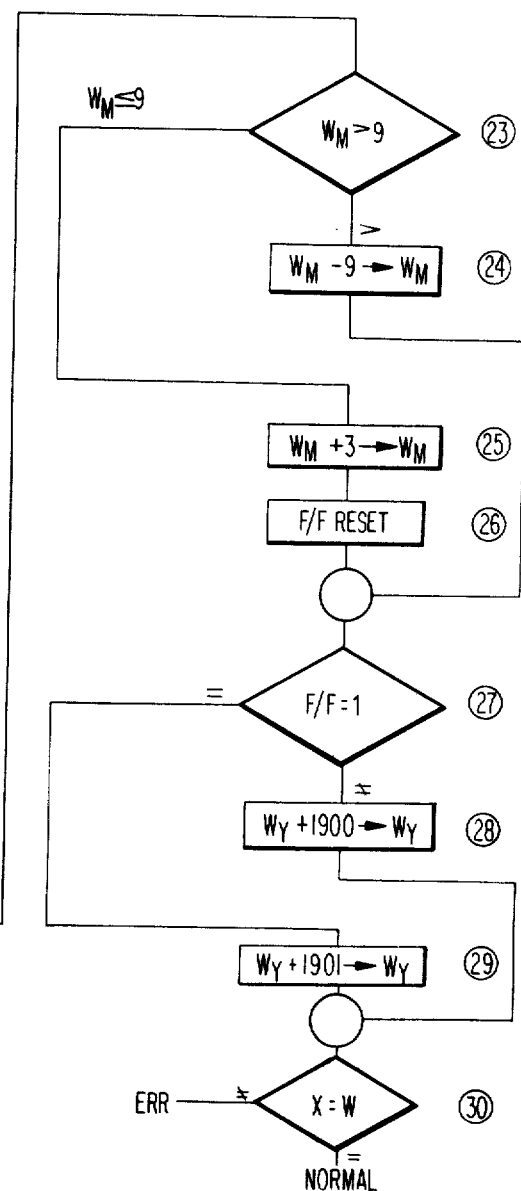

Next, the inverse calculation will be described with reference to FIGS. 1 and 3. The inverse-calculation unit 13 is operatively associated with W register 20, Z register 21 and flip-flop 22 and includes arithmetic means (e.g. an adder), gating means for interfacing W register 20 and Z register 21. In response to signal 14h, the unit 13 is enabled. At a step (10), "0" is loaded into the memory areas $W_Y$, $W_M$, and $W_D$ in W register 20 to set them to initial states. In a step (11), the contents of the register 6, i.e. the average days of one year, 365.25, is introduced into the inverse-calculation unit 13 via AND gate 11 in synchronism with the control signal 14f. In the unit 13, the contents of Z register 21 which is the number of days is divided by the average days 365.25 introduced. The integer part of the quotient as a result of the division is loaded as an inversely-calculated year difference in the memory area $W_Y$. In a step (12), the days difference corresponding to the year difference, that is, the product of the contents of the area $W_Y$ and 365.25, is subtracted from the contents of Z register 21. Then, the subtraction is rounded to one decimal place by adding 0.9 thereto which corresponds to the sum of the difference days relating to the difference months and days per se. The integer of a value obtained through this operation, that is the rounded subtraction, is loaded into Z register 21. Then, at step (13), the flip-flop 22 is set. The flip-flop 22 is used for judging whether the inversely-calculated "month" is January or February in the proceeding step. Then, in step (14) the contents of Z register 21 are checked to determine whether it is "0". If it is "0", the date is February 29 of a leap year. In this case, at step (15) 366 is loaded into Z register 21, and at step (16) the flip-flop 22 is reset. In step (17), the contents 30.6 of the register 7 are loaded into the date inverse-calculation unit 13 via AND gate 12 in synchronism with control signal 14g. In the unit 13, the constant 30.6 is used to divide the contents of Z register 21. The integer of the quotient of the division is loaded as an inversely-calculated month difference in the memory area $W_M$. In step (18), the product of the quotient in step (17), i.e. the contents of the memory area $W_M$ and the constant 30.6 are subtracted from the contents of Z register 21. The difference as a result of the subtraction is loaded into Z register 21. The integral part of a value obtained by rounding the figures of the surplus below the decimal point by adding 0.5 thereto corresponds to the number of days per se. When the surplus has no integer part, that is the content of Z is below 0.6, the following correction is executed. Specifically, in step (19), the contents of Z register 21 is checked to determine whether they are larger than 0.6. When the contents are below 0.6 in which the surplus has no integer part, the operation proceeds to the next step (20) where 31 is loaded into Z register 21 and, in step (21), 1 is subtracted from the contents of the memory area $W_M$ and the difference obtained is reloaded into the memory area $W_M$. Then, the operation advances to step (22) where 0.5 is added to the contents of Z register 21 to round the contents at one decimal place. And the integer part of the rounded result is loaded into the memory area $W_D$ as an inversely-calculated date.

Then, the inversely-calculated month difference thus obtained, i.e. the contents of the memory area $W_M$, is the difference counted from March. Accordingly, when this value is within 0 to 9, the inversely-calculated month can be obtained by adding 3 to the value. Namely, in step (23), the contents of the memory area $W_M$ are checked to determine if they are larger than 9 or not. If they are equal to or less than 9, the operation advances to step (25), where 3 is added to the contents of $W_M$ and the result of the addition is reloaded into $W_M$ as the inversely-calculated month. Then in step (26) the flip-flop 22 is reset since the inversely-calculated month is within a range from March to December. On the other hand, when the contents of $W_M$ is larger than 9 in step (23), it corresponds to January or February. Accordingly, in step (24), 9 is subtracted from the contents of $W_M$ and the result of this subtraction is loaded into the memory area $W_M$ as the inversely-calculated month. In the case where the month difference, i.e. the contents of the memory area $W_M$ in step (23), is 10 or 11 months, it corresponds to January or February. In this case, it is required to compensate the correction mentioned relating to the days calculating unit 10, that is, adding "1" to the year difference stored in the memory area $W_Y$. Accordingly, in step (27) the state of the flip-flop 22 is checked. If the flip-flop 22 is set, i.e. "1", the operation advances to a step (29) where 1 is added to the contents $W_Y$, i.e. the year difference. A value obtained by adding 1900 to the year difference is the dominical year inversely-calculated. The result of this is again loaded into the memory area $W_Y$. On the other hand, unless the flip-flop 22 is "1", step (28) is performed. In this step, 1900 is added to the contents of $W_Y$, i.e. the year difference and the sum thereof is loaded as the dominical year inversely-calculated. In this way, the dominical year, the months and the day, which are inversely calculated, are stored in the memory areas $W_Y$, $W_M$ and $W_D$ in W register 20, respectively. The date thus calculated is compared with the input date data stored in X register 4 in step (30). When these are coincident, the input date really exists, and when these are not coincident each other, the input data is unreal.

The date thus inversely-calculated is transferred to the register 16 through an AND gate 15 in response to a control signal 14i. The outputs of the registers 4 and 16 are applied to an exclusive OR gate 17, the output of which is coupled to the reset input terminal of the R-S flip-flop 18. The comparison of the contents of the register 4, that is the date data inputted by the key operation, with the date data inversely-calculated and stored in the register 16, is carried out in the following maner.

Firstly, a control signal 14j is generated as a set signal for the R-S flip-flop 18 at an arbitrary time before the generation of the signal 14i, and the output Q of the R-S flip-flop 18 is set to logic "1". Under this condition, the exclusive OR gate 17 produces logic "1" and at this time the R-S flip-flop 18 is reset to produce logic "0" at the output Q and "1" at the output $\bar{Q}$. This state corresponds to a state that the contents of the registers 4 and 16 are not coincident with each other. While logic "0" appears at the output of the exclusive OR gate 17 and is applied to the reset terminal of the R-S flip-flop 18, the flip-flop 18 produces logic "1" at the output Q, and continues this output state. This state indicates that the contents of both the registers 4 and 16 are coincident each other. Then, the output Q of the R-S flip-flop 18 is applied to the control signal generator 14 to inform it of that the input date data really exists or not. Upon receipt of the output Q, the control signal generator 14 performs a given operation. If the date data processor is provided with a display device for displaying a special indication and when the output Q of the R-S flip-flop 18 is logic "0", an operator visually recognizes that the input date data is erronous. To this end, logic "1", for example, of the output $\bar{Q}$ may be used in place of the "0" of the output Q.

Let us consider two cases; one for the 13th month 1, 1977, stored in the register 4, the other for Jan. 1, 1978, stored therein. In the case of the 13th month 1, 1977, a difference of days is calculated by the days calculating unit 10 and is 28431. This days difference is applied to the date inverse-calculation unit 13 where it is subjected to the inverse-calculation to obtain Jan. 1, 1978, which in turn is stored in the register 16. The combination of the exclusive OR gate 17 and the R-S flip-flop 18 compares the 13th month 1, 1977, in the register 4 with Jan. 1, 1978. In this case, the output of the R-S flip-flop 18 is logic "0" indicating that the contents in the register 4 are unreal. The controller 14 displays this by the display means and stops the succeeding operation. While in the case of Jan. 1, 1978, the register 16 also stores Jan. 1, 1978 inversely calculated. The output of the R-S flip-flip 18 is logic "1" so that it is judged that the contents of the register 4 really exist. In this case, the controller 14 operates so that the result of this is not displayed and the succeeding operation is performed.

As described above, according to the invention, in a small-sized computer executing the operation relating to the date data, it is possible to judge the data which is unreal. Accordingly, when an input date is erronous, the succeeding calculation which is nonsense is eliminated. In the above-mentioned embodiment, the reference date is Mar. 1, 1900, but it is not limited to that. The calculating method for obtaining the number of days and the inverse calculation method may also be changed in accordance with the reference date selected. In the present invention, the register 16 can be eliminated by directly utilizing W register 20 for comparison with the contents of X register 4 where the function of the gate 15 is included in the unit 13. Also in the present invention ramdom access memory circuits may be used in place of registers 4, 16, 20 and 21.

We claim:

1. A date data processing system comprising first memory means for storing a date to be processed, means for calculating a difference in days from a reference date to said date, means for producing an inversely-calculated date by inversely-calculating a date from said difference in days and said reference date, second memory means for storing said inversely-calculated date, means for comparing the contents of said first memory means with the contents of said second memory means, and wherein said first memory means retains said date to be processed at least until termination of comparison by said comparing means.

2. The system according to claim 1, in which said reference date is Mar. 1, 1900.

3. The system according to claim 1, wherein said means for calculating comprises a days calculating unit, a first register and a second register, said days calculating unit being connected to transfer the contents of said first memory means to said first register, said first register being composed of three sections according to month, day and year, said days calculating unit computing in succession, the difference between the date to be processed and the reference date in years, months in excess of said years, and days in excess of said years and months, the product of said last mentioned years and 365.25 and the product of said excess months and 30.6 and then summing the integer parts of said products with said excess days and storing the result in said second register.

4. The system according to claim 3, wherein said means for producing comprises an inverse calculating unit, said first register and said second register, said inverse-calculating unit being connected to compute a date from the days difference stored in said second register and storing the result in said first register, said inverse-calculating unit computing in succession the quotient of the contents of said second register and 365.25 and the quotient of the remainder of the first quotient and 30.6, the integer parts of said first and second quotients being stored in the years and months' sections, respectively, of said first register and the integer part of the remainder of said second quotient being stored in the days' section of said first register.

5. The system according to claim 4 wherein said inverse-calculating unit is further connected to transfer the calculated date stored in said first register to said second memory means.

6. The system according to claim 4 wherein said second memory means is said first register.

7. The system according to claim 1 wherein said means for comparing comprises an Exclusive OR gate connected to synchronously receive the contents of said first and second memory means.

* * * * *

UNITED STATES PATENT AND TRADEMARK OFFICE
CERTIFICATE OF CORRECTION

PATENT NO. : 4,233,665
DATED : Nov. 11, 1980
INVENTOR(S) : Yukio Maehashi; Hidetoshi Kosaka It is certified that error appears in the above—identified patent and that said Letters Patent is hereby corrected as shown below:

IN THE SPECIFICATION:

Column 1, line 12 - After "data" delete "imputted".

Column 3, line 1 - After "date" (first occurrence) insert --,--.

line 1 - After "4" insert --,--.

Column 4, line 4 - Delete "data" insert --date--.

line 4 - Delete "i.e," insert --i.e.--.

Column 5, line 15 - After "(25)" delete ",".

line 48 - Delete "data" insert --date--.

line 52 - Delete "exclusive" insert --Exclusive--.

line 62 - Delete "exclusive" insert --Exclusive--.

line 67 - Delete "exclusive" insert --Exclusive--.

UNITED STATES PATENT AND TRADEMARK OFFICE
CERTIFICATE OF CORRECTION

PATENT NO. : 4,233,665
DATED : Nov. 11, 1980
INVENTOR(S) : Yukio Maehashi; Hidetoshi Kosaka It is certified that error appears in the above—identified patent and that said Letters Patent is hereby corrected as shown below:

Column 6, line 24 - Delete "exclusive" insert --Exclusive--.

line 37 - After "judge the" delete "data" insert --date--.

line 49 - Delete "ramdom" insert --random--.

Signed and Sealed this

Fifth Day of May 1981

[SEAL]

Attest:

RENE D. TEGTMEYER

Attesting Officer    Acting Commissioner of Patents and Trademarks